United States Patent
Plaeru et al.

(10) Patent No.: US 12,222,041 B2
(45) Date of Patent: Feb. 11, 2025

(54) FLUID VALVE

(71) Applicant: Vitesco Technologies GmbH, Regensburg (DE)

(72) Inventors: George Plaeru, Munich (DE);
Daniel-Marius Pop, Munich (DE);
Alexandru Popa, Munich (DE);
Cosmin Ion Belin, Munich (DE)

(73) Assignee: Vitesco Technologies GmbH, Regensburg (DE)

( * ) Notice: Subject to any disclaimer, the term of this patent is extended or adjusted under 35 U.S.C. 154(b) by 0 days.

(21) Appl. No.: 17/767,785

(22) PCT Filed: Oct. 1, 2020

(86) PCT No.: PCT/EP2020/077498
§ 371 (c)(1),
(2) Date: Apr. 8, 2022

(87) PCT Pub. No.: WO2021/073884
PCT Pub. Date: Apr. 22, 2021

(65) Prior Publication Data
US 2022/0364653 A1    Nov. 17, 2022

(30) Foreign Application Priority Data
Oct. 14, 2019   (EP) .................................... 19465575

(51) Int. Cl.
*F16K 11/087* (2006.01)
*F16K 27/06* (2006.01)
*B60H 1/00* (2006.01)

(52) U.S. Cl.
CPC ........ *F16K 11/0876* (2013.01); *F16K 27/067* (2013.01); *B60H 1/00485* (2013.01); *Y10T 137/0508* (2015.04); *Y10T 137/87249* (2015.04)

(58) Field of Classification Search
CPC .. F16K 11/0876; F16K 11/163; F16K 27/067; F16K 31/535; F16K 31/54;
(Continued)

(56) References Cited

U.S. PATENT DOCUMENTS 600,829 A * 3/1898 Donaldson ............. B01D 53/74
184/39.1
944,026 A * 12/1909 Fowden ............... F16K 37/0008
137/625.3
(Continued)

FOREIGN PATENT DOCUMENTS

DE   4235723    4/1994
DE   19525062   6/1996
(Continued)

OTHER PUBLICATIONS

Office Action of corresponding German Patent Application No. 10 2020 201 190.7, Date: Sep. 2020.
(Continued)

*Primary Examiner* — Craig J Price
(74) *Attorney, Agent, or Firm* — COZEN O'CONNOR

(57) ABSTRACT

A fluid valve, in particular for a motor vehicle and/or a temperature control system, having a housing and a valve body disposed in the housing so as to be rotatable about a rotation axis. The housing has a first port and a third port disposed on opposite side of a normal plane in relation to the rotation axis and a second port which is radially spaced apart from the rotation axis and in the direction of the rotation axis is disposed between the first and the third port. The valve body in at least one rotary position connects at least two ports of the housing to one another, and in at least one other rotary position does not connect the two ports to one another.

15 Claims, 7 Drawing Sheets

(58) Field of Classification Search
CPC .............. F16K 31/563; F16K 11/0836; F16K 11/0856; Y10T 137/86566; Y10T 137/86863; Y10T 137/86638–86662; Y10T 137/86533; Y10T 137/86541; Y10T 137/86743; Y10T 137/86751; Y10T 137/86823; Y10T 137/87249; Y10T 137/0508; F01P 5/12; F01P 7/165; F01P 2007/146; B60H 1/00485
USPC ............ 137/625.46, 625.21–625.24, 625.19, 137/625.15, 625.16, 625.31, 625.32, 137/625.41, 597
See application file for complete search history.

(56) References Cited

U.S. PATENT DOCUMENTS

| | | | | |
|---|---|---|---|---|
| 1,018,165 | A * | 2/1912 | Clark | B61D 7/28 105/308.1 |
| 1,073,305 | A * | 9/1913 | Thomsen et al. | F22G 7/065 122/DIG. 15 |
| 1,339,284 | A * | 5/1920 | Petry | F01N 13/087 137/625.48 |
| 1,422,178 | A * | 7/1922 | Cooley | F16K 11/0853 251/297 |
| 1,603,837 | A * | 10/1926 | Carson | F16K 39/06 137/625.46 |
| 1,825,443 | A * | 9/1931 | Chormann | A23C 3/031 137/169 |
| 1,846,865 | A * | 2/1932 | Hapgood | F16K 11/083 137/625.42 |
| 1,958,228 | A * | 5/1934 | Wilson | C10B 55/00 137/340 |
| 2,129,231 | A * | 9/1938 | Parker | F16K 11/0856 137/625.29 |
| 2,160,741 | A * | 5/1939 | Jensen | B67D 7/06 222/627 |
| 2,198,386 | A * | 4/1940 | Hiester | F16K 11/08 251/297 |
| 2,351,613 | A * | 6/1944 | Hopkins | F16K 11/0525 137/625.46 |
| 2,611,392 | A * | 9/1952 | Johnson | F16K 11/0743 137/625.46 |
| 2,620,106 | A * | 12/1952 | Weeks | B08B 9/0328 222/145.2 |
| 2,698,120 | A * | 12/1954 | Fairchild | B65B 55/10 53/131.1 |
| 2,835,273 | A * | 5/1958 | McDonald | F16K 11/085 137/625.42 |
| 2,921,998 | A * | 1/1960 | Pokorny | H02B 11/00 200/50.22 |
| 2,996,083 | A * | 8/1961 | Huska | F16K 11/085 137/625.11 |
| 3,021,869 | A | 2/1962 | Ross | |
| 3,034,528 | A * | 5/1962 | Wharff, Jr. | F16K 11/083 137/246.22 |
| 3,190,584 | A * | 6/1965 | Gire | F16K 11/085 137/869 |
| 3,194,267 | A * | 7/1965 | Lyon | F16K 11/085 137/625.11 |
| 3,251,408 | A * | 5/1966 | Watson | F01K 9/003 165/104.31 |
| 3,339,583 | A * | 9/1967 | Fleckenstein | F16K 11/08 137/625.29 |
| 3,499,467 | A * | 3/1970 | Lang, Jr. | F16K 11/0836 137/625.19 |
| 3,640,310 | A * | 2/1972 | Erlich | F16K 11/074 210/411 |
| 3,773,076 | A * | 11/1973 | Smith | F16K 11/12 137/625.19 |
| 3,939,871 | A * | 2/1976 | Dickson | F23K 5/18 137/625.47 |
| 4,397,335 | A * | 8/1983 | Doblar | A61M 39/223 604/32 |
| 4,958,660 | A * | 9/1990 | Eke | F16K 11/12 4/675 |
| 4,989,641 | A * | 2/1991 | Jones | F16K 31/52466 251/188 |
| 5,046,522 | A * | 9/1991 | Le Devehat | F16K 11/085 137/554 |
| 5,273,073 | A * | 12/1993 | Romanchik | F16K 11/0853 251/59 |
| 5,375,622 | A * | 12/1994 | Houston | F16K 24/02 137/240 |
| 5,529,758 | A * | 6/1996 | Houston | F16K 11/0853 422/171 |
| 5,820,133 | A * | 10/1998 | Altshuler | F16K 11/0856 277/630 |
| 5,848,610 | A * | 12/1998 | Livernash | F16K 11/072 137/625.46 |
| 5,927,330 | A | 7/1999 | Minton et al. | |
| 6,647,934 | B2 * | 11/2003 | Marsh | F02B 39/005 60/599 |
| 6,662,384 | B1 * | 12/2003 | Gardenier | A61H 33/0087 4/615 |
| 6,681,805 | B2 * | 1/2004 | McLane | F16K 11/0856 137/625.16 |
| 6,994,316 | B2 * | 2/2006 | Pervaiz | F16K 11/085 251/175 |
| 7,131,460 | B2 * | 11/2006 | McLane | F16K 11/0856 137/625.47 |
| 7,163,194 | B2 * | 1/2007 | Pervaiz | F16K 5/0478 251/63.4 |
| 7,165,513 | B2 * | 1/2007 | Humburg | B60H 1/00978 165/41 |
| 7,168,398 | B2 * | 1/2007 | Ap | F01P 7/165 123/41.31 |
| 7,255,130 | B2 * | 8/2007 | Martins | B60H 1/00485 137/625.46 |
| 7,506,664 | B2 * | 3/2009 | Norris | F16K 11/0876 137/625.42 |
| 7,690,397 | B2 * | 4/2010 | Hollis | F16K 11/076 251/310 |
| 8,356,629 | B2 * | 1/2013 | Koyama | A61M 39/223 604/248 |
| 8,371,334 | B2 * | 2/2013 | Ozawa | F16K 11/0856 137/563 |
| 8,393,305 | B2 * | 3/2013 | Farkh | F01P 7/16 123/41.31 |
| 8,505,580 | B2 * | 8/2013 | Ary | F16K 11/0856 137/625.43 |
| 8,839,818 | B2 * | 9/2014 | Ide | F16K 11/0853 251/118 |
| 8,905,076 | B2 * | 12/2014 | Jorgensen | F16K 11/0856 237/12.3 B |
| 8,919,378 | B2 * | 12/2014 | Bartnick | F16K 11/0856 251/317.01 |
| 9,382,833 | B2 * | 7/2016 | Morein | F01P 7/14 |
| 9,404,594 | B2 * | 8/2016 | Morein | F16K 11/0856 |
| 9,481,477 | B2 * | 11/2016 | Kjar | C12M 23/40 |
| 9,523,434 | B2 * | 12/2016 | Nagahama | F16K 5/0471 |
| 9,827,824 | B2 * | 11/2017 | Enomoto | B60H 1/08 |
| 9,863,545 | B2 * | 1/2018 | Kawamura | A47L 7/0057 |
| 9,932,882 | B2 * | 4/2018 | Imasaka | F01P 7/14 |
| 9,958,074 | B2 * | 5/2018 | Wan | E21B 34/00 |
| 10,094,268 | B1 * | 10/2018 | Russalian | F01P 7/16 |
| 10,094,480 | B2 * | 10/2018 | Partridge | F16K 1/24 |
| 10,180,190 | B2 * | 1/2019 | G. R. | F15B 13/0401 |
| 10,221,952 | B2 * | 3/2019 | Yoo | F16K 11/0856 |
| 10,295,076 | B2 * | 5/2019 | Russalian | F01P 7/16 |
| 10,330,208 | B2 * | 6/2019 | Takamatsu | F16K 27/06 |
| 10,337,626 | B2 * | 7/2019 | Takamatsu | F16K 11/076 |
| 10,344,877 | B2 * | 7/2019 | Roche | B60H 1/00485 |
| 10,428,721 | B2 * | 10/2019 | Murakami | F16K 31/041 |
| 10,458,562 | B2 * | 10/2019 | Ozeki | F16K 31/041 |
| 10,539,064 | B2 * | 1/2020 | Sato | F01P 11/14 |
| 10,563,780 | B2 * | 2/2020 | Leroyer | F16K 11/076 |
| 10,788,135 | B2 * | 9/2020 | Whitaker | F16K 11/0853 |
| 10,865,668 | B2 * | 12/2020 | Wong | F01L 7/02 |

(56) References Cited

U.S. PATENT DOCUMENTS

| | | | | |
|---|---|---|---|---|
| 10,883,619 | B2* | 1/2021 | Smith | F16K 27/065 |
| 10,927,972 | B2* | 2/2021 | Murakami | F16K 31/002 |
| 11,168,797 | B2* | 11/2021 | Dragojlov | F16K 31/535 |
| 11,215,491 | B2* | 1/2022 | Yaklin | G01F 15/005 |
| 11,247,528 | B2* | 2/2022 | Han | F16K 11/072 |
| 11,255,450 | B2* | 2/2022 | Ledvora | F16K 5/0471 |
| 11,378,189 | B2* | 7/2022 | Shen | F16K 31/535 |
| 11,428,338 | B2* | 8/2022 | Soubjaki | F16K 17/048 |
| 11,592,115 | B2* | 2/2023 | Kostański | F16K 11/0836 |
| 11,592,116 | B2* | 2/2023 | Svejcar | F16K 11/085 |
| 11,629,791 | B2* | 4/2023 | Dragojlov | F16K 31/535 137/625 |
| 11,655,905 | B2* | 5/2023 | Ledvora | F16K 11/0853 137/625.46 |
| 11,703,135 | B2* | 7/2023 | Gill | F16K 11/0856 137/625.47 |
| 11,719,350 | B2* | 8/2023 | Dragojlov | F16K 11/0876 137/625.19 |
| 11,773,990 | B2* | 10/2023 | Koch | F16K 11/0853 137/1 |
| 11,781,662 | B2* | 10/2023 | Schäfer | F16K 11/085 137/625.47 |
| 11,796,073 | B2* | 10/2023 | Svejcar | F16K 11/0743 |
| 2003/0196713 | A1* | 10/2003 | Ma | F16K 11/0836 137/625.47 |
| 2004/0173510 | A1* | 9/2004 | Jung | F16K 31/041 210/411 |
| 2015/0354714 | A1 | 12/2015 | Morein | |
| 2015/0354716 | A1* | 12/2015 | Morein | F16K 11/0853 137/625.47 |
| 2019/0072191 | A1 | 3/2019 | Shen et al. | |
| 2020/0393053 | A1* | 12/2020 | Dragojlov | F16K 11/165 |
| 2021/0080016 | A1* | 3/2021 | Wong | F16K 11/085 |
| 2021/0108494 | A1* | 4/2021 | Cook | F16K 11/0876 |
| 2021/0381422 | A1* | 12/2021 | Osmun | F16K 11/0873 |
| 2021/0381607 | A1* | 12/2021 | Koch | F16K 11/076 |
| 2024/0131919 | A1* | 4/2024 | Suzuki | B60H 1/00 |

FOREIGN PATENT DOCUMENTS

| | | |
|---|---|---|
| DE | 102018214174 | 2/2019 |
| FR | 1425375 | 1/1966 |
| GB | 2024991 | 1/1980 |

OTHER PUBLICATIONS

Office Action (with English translation) dated Sep. 9, 2024, issued in German Patent Application No. 10 2020 201 190.7, 20 pages.

* cited by examiner

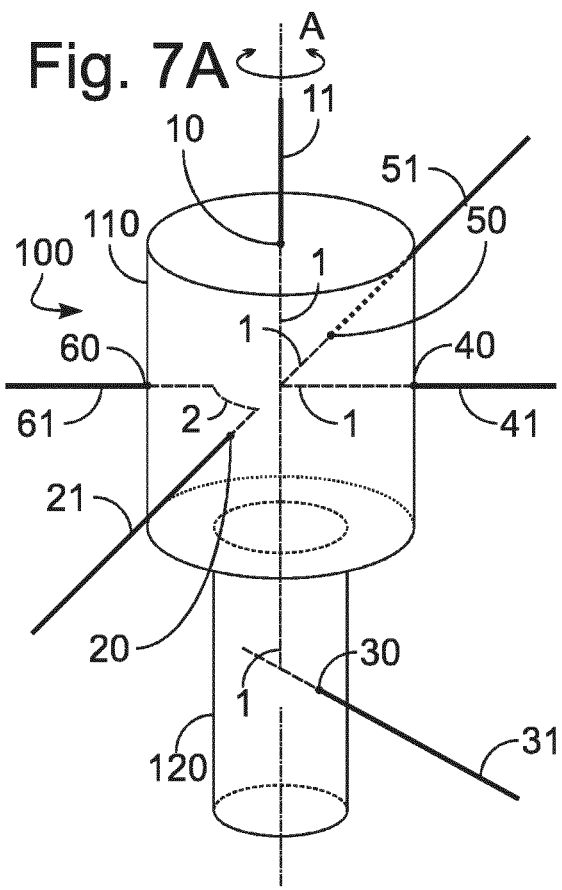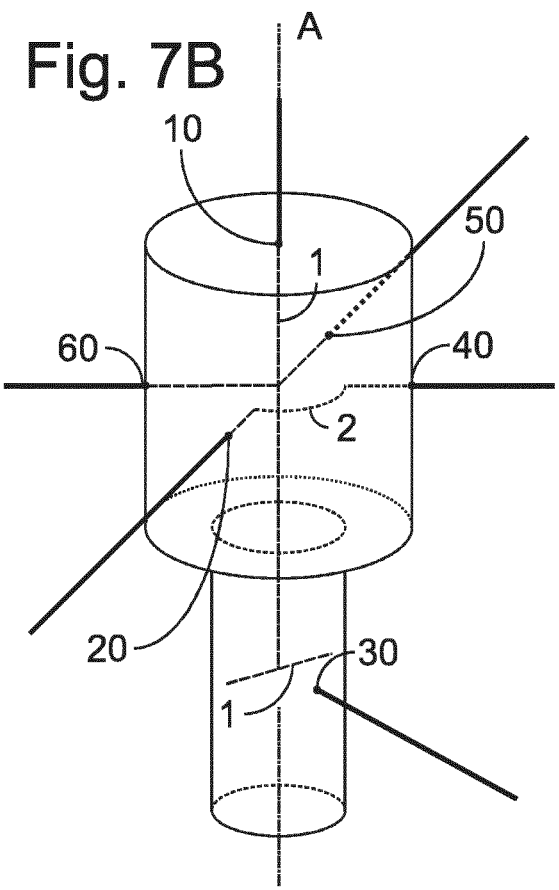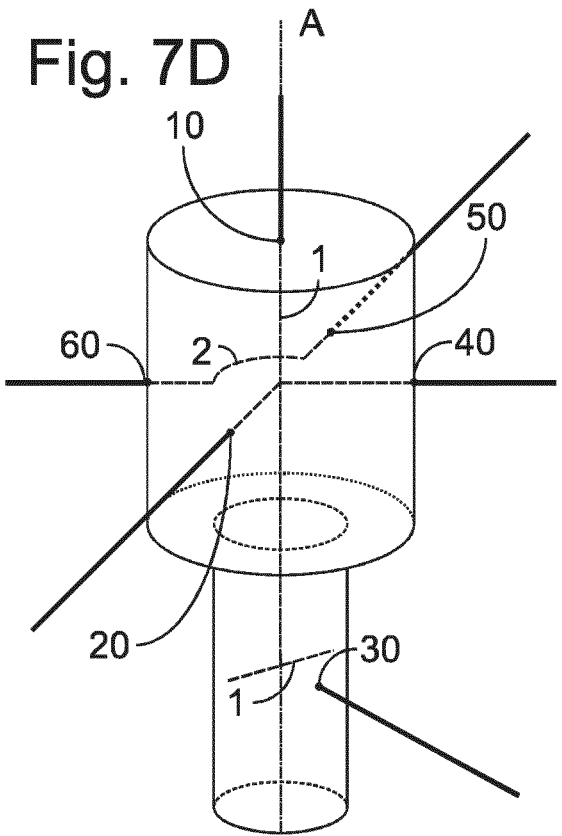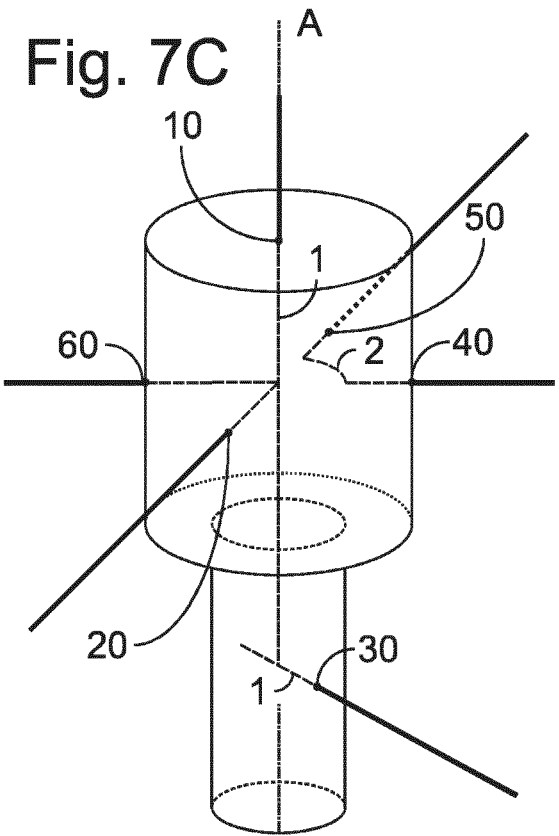

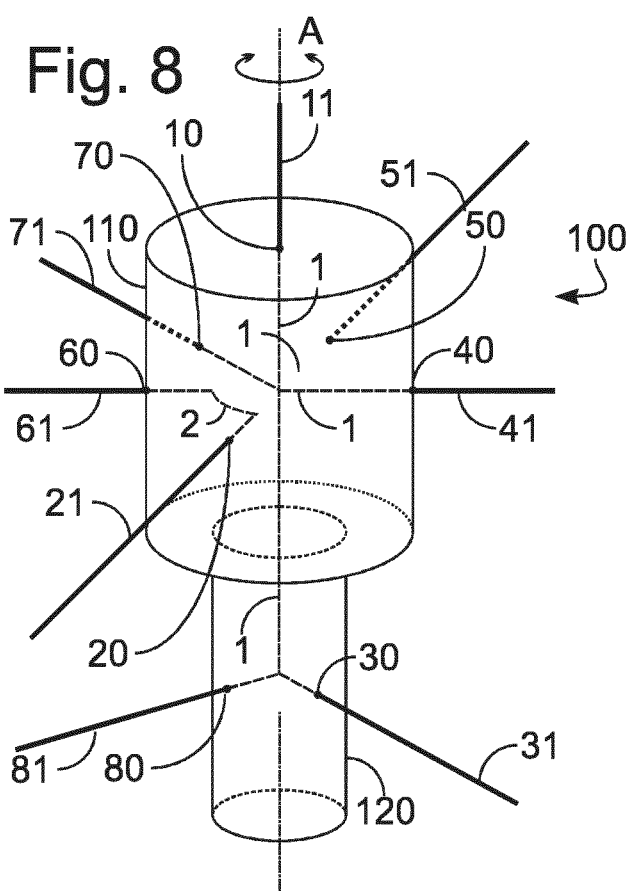

FLUID VALVE

CROSS REFERENCE TO RELATED APPLICATIONS

This is a U.S. national stage of Application No. PCT/EP2020/077498 filed Oct. 1, 2020. Priority is claimed on European Application No. EP 19465575.9 filed Oct. 14, 2019 the content of which is incorporated herein by reference.

FIELD OF THE INVENTION

The present disclosure relates to a fluid valve, in particular for a motor vehicle and/or a temperature control system, to a temperature control system, in particular for a motor vehicle, having the fluid valve, to a motor vehicle having the fluid valve, in particular the temperature control system, and to a method for operating the fluid valve.

SUMMARY OF THE INVENTION

It is an object of one aspect of the present invention to improve a fluid valve or the operation thereof, respectively.

According to one aspect of the present invention, a fluid valve, in particular for a motor vehicle and/or a temperature control system, has (at least) one fluid valve of a motor vehicle and/or temperature control system, in particular thus for or of a motor vehicle temperature control system, respectively, one integral or multiple-part housing and one integral or multiple-part valve body which at least in part is disposed in the housing, in particular in a cavity of the housing and mounted so as be rotatable relative to the housing about a rotation axis.

In one aspect of the present invention, the motor vehicle is a passenger motor vehicle and/or the temperature control system is a cooling and/or heating system, in particular an air conditioning system or a motor temperature control system. In one embodiment, the fluid valve is a fluid control or regulator valve respectively, which selectively, or in different operating states or valve positions, respectively, switches different fluid ducts, in particular liquid ducts, in particular lines in which overpressure prevails in one embodiment, in mutually dissimilar ways, in particular selectively connects fluid ducts to one another, or selectively blocks fluid ducts, respectively, or is provided, in particular specified or used therefor, respectively. According to one aspect, the fluid valve is filled or operated, respectively with a liquid, in one refinement with in particular pressurized water, and in particular pressurized water/glycol solution or the like, or is provided, in particular specified or used therefor, respectively. In one embodiment, the one or more of the ports of the housing mentioned hereunder are in each case fluidically linked to such a fluid duct, or are provided, in particular specified or used therefor, respectively.

According to one aspect of the present invention, the housing has a first port, a second port, and a third port, wherein the first and the third port are disposed on mutually opposite sides of a normal plane in relation to the rotation axis, in particular to be spaced apart from one another when viewed in the direction of the rotation axis, or to be axially spaced apart from one another, respectively, and in one embodiment the second port is disposed so as to be radially spaced apart from the rotation axis and/or when viewed in the direction of the rotation axis, or axially, respectively, is disposed between the first and the third port.

In one aspect of the invention, the housing has a fourth port which is radially spaced apart from the rotation axis and/or in the circumferential direction about the rotation axis is disposed so as to be spaced apart from the first port, from the second port, and/or from the third port, and/or in the direction of the rotation axis is disposed between the first and the third port.

In one refinement, the housing has a fifth port, which is radially spaced apart from the rotation axis and/or in the circumferential direction about the rotation axis, is disposed to be spaced apart from the first port, from the second port, from the third port, and/or the fourth port, and/or in the direction of the rotation axis is disposed between the first and the third port.

In one refinement, the housing has a sixth port, which is radially spaced apart from the rotation axis and/or in the circumferential direction about the rotation axis is disposed so as to be spaced apart from the first port, from the second port, from the third port, from the fourth port, and/or from the fifth port, and/or in the direction of the rotation axis is disposed between the first and the third port.

In one refinement, the housing has one or a plurality of further ports, one or a plurality of which in one embodiment being in each case disposed so as to be radially spaced apart from the rotation axis and/or in the circumferential direction about the rotation axis being spaced apart from the first, the second, the third, the fourth, the fifth and/or the sixth port, and/or in the direction of the rotation axis, or axially, respectively being disposed between the first and the third port, and/or the second port being disposed between the further ports and the first or the third port.

In one embodiment, the valve body has
one first, in particular in portions single-duct and/or at least in portions multiple-duct, fluid passage which in at least one rotary position of the valve body connects one first group of two or more (of) the port(s) of the housing to one another; and
one or a plurality, in particular fluidically separated therefrom, in particular (in each case) at least in portions single-duct and/or at least in portions multiple-duct, fluid passages which in the and/or at least one other rotary position of the valve body connect (in each case) one second group of two or more (of the) port(s) of the housing to one another and not to (the ports) of the first group.

According to one aspect of the present invention, the valve body, in particular one of the fluid passages thereof, in one or a plurality of rotary positions connects at least two ports of the housing to one another, wherein the valve body in one or a plurality of other rotary positions does not connect the two (of the) ports of the housing to one another, or the fluid valve, in particular the housing and/or the valve body, respectively, are/is provided, in particular specified or used therefor, respectively.

On account thereof, in particular on account of the disposal of the first and the third port on mutually opposite sides of a normal plane in relation to the rotation axis and on account of the second port that is radially spaced apart from the rotation axis between the first and the third port, in particular in combination with the fourth port, in particular in combination with the fifth port, in particular in combination with the sixth port, in particular in combination with the further port or ports, respectively, and/or in particular in combination with the first and the further fluid passage or passages, respectively, in one embodiment a compact fluid valve is made available that enables or implements, respectively, the selective dissimilar switching of a plurality of fluid ducts connected to the ports of the fluid valve, in particular the selective dissimilar connecting and/or blocking of the fluid ducts.

In one embodiment, the second, the fourth, the fifth, the sixth, and optionally the further port, or one or a plurality of the further ports, which in the direction of the rotation axis are disposed between the first and the third port are distributed equidistantly in the circumferential direction about the rotation axis.

In one aspect, the linking of the fluid valve to (the) fluid ducts can be improved on account thereof.

In one aspect, the valve body, in particular one of the fluid passages thereof, in one or a plurality of rotary positions connects in each case three or more of the ports of the housing to one another, wherein the valve body in one or a plurality of other rotary positions does (in each case) not connect at least two of the at least three ports to one another, in one refinement does not connect any of the three ports to one another, or the fluid valve, in particular the housing and/or the valve body, is/are provided, in particular specified or used therefor, respectively. In one embodiment, the valve body, in particular one of the fluid passages thereof, in at least one rotary position connects at least one group of three ports of the housing to one another, wherein the valve body in at least one other rotary position does not connect at least two ports of the group, in particular at least three ports of the group, to one another, in one refinement does not connect a pair of the ports of the group to one another, or the fluid valve, in particular the housing and/or the valve body, are/is provided, in particular specified or used therefor, respectively.

In one aspect, fluid flows can advantageously be mixed or split on account thereof.

Additionally or alternatively, the valve body in one embodiment, in particular the first fluid passage thereof, in one or a plurality of rotary positions connects at least one first group of two or more port(s) of the housing to one another, wherein the valve body, in particular of the further fluid passage(s) connects at least one second group of two or more port(s) of the housing to one another and not to the first group. In one embodiment, the valve body, in particular the first or the further fluid passage thereof, in one or a plurality of other rotary positions connects one or a plurality of the ports from the first group and one or a plurality of the ports from the second group to one another and/or connects or does not connect at least two ports from the first group to one another and/or connects or does not connect at least two ports from the second group to one another, or the fluid valve, in particular the housing and/or the valve body, are provided, in particular specified or used therefor, respectively.

In one embodiment, the first fluid passage in a single-part or multiple-part shell face of the valve body has at least one opening, in particular at least two openings that in the circumferential direction about the rotation axis are spaced apart from one another, and/or in an end face of the valve body has at least one opening, in particular in end faces of the valve body has at least two openings that in the direction of the rotation axis are spaced apart from one another.

Additionally or alternatively, the further fluid passage in one embodiment in the or a, respectively, single-part or multiple-part shell face of the valve body has at least one opening, in particular at least two openings that in the circumferential direction about the rotation axis are spaced apart from one another, and/or in the or an end face, respectively, of the valve body has at least one opening, in particular in end faces of the valve body has at least two openings that in the direction of the rotation axis are spaced apart from one another.

Additionally or alternatively, in one embodiment at least two (of the) openings of the first fluid passage in the or a, respectively, single-part or multiple-part shell face of the valve body are radially dissimilarly spaced apart from the rotation axis.

Additionally or alternatively, in one embodiment at least two (of the) openings of the further fluid passage in the or a, respectively, single-part or multiple-part shell face of the valve body are radially dissimilarly spaced apart from the rotation axis.

Additionally or alternatively, in one embodiment at least one (of the) opening(s) of the first fluid passage in the or a, respectively, single-part or multiple-part shell face of the valve body, and at least one (of the) opening(s) of the further fluid passage in the or a, respectively, single-part or multiple-part shell face of the valve body are radially dissimilarly spaced apart from the rotation axis.

Additionally or alternatively, in one embodiment the first and the further fluid passage in at least two different rotary positions of the valve body connect the same port to one or a plurality (of the) other port(s) of the housing, in particular the first fluid passage in at least one rotary position of the valve body connects a (selected) port to one or a plurality (of the) other port(s) of the housing, and the second fluid passage in at least one rotary position of the valve body different therefrom connects the one (selected) port to the other of the port(s) of the housing and/or to dissimilar other of the port(s) of the housing different therefrom.

In one embodiment, in particular in combination with two or more of the afore-mentioned features, a compact fluid valve that enables or implements, respectively, particularly advantageous selective dissimilar switching of fluid ducts that are connected to the ports of the fluid valve is enabled or implemented on account thereof, respectively.

In one aspect of the invention, fluid from one or a plurality of the ports mentioned here flows in or out, respectively, through one or a plurality of the openings of the fluid passages mentioned above, and/or the openings and/or ports are provided, in particular specified or used therefor, respectively, in particular thus (as) inlet or outlet openings, respectively, of the fluid passages (for fluidically coupling to the ports).

In one aspect of the invention, the second port in at least one rotary position of the valve body by way of one (of the) fluid passage opening(s) in an in particular spherical or cylindrical ring of the valve body, in particular of the shell face of the valve body, is connected to at least one other port of the housing, and the first or the third port in at least one, in particular the rotary position of the valve body and/or at least one rotary position of the valve body that is different therefrom, by way of one of the fluid passage opening(s) in an in particular cylindrical shank of the valve body, in particular the shell face of the valve body, is connected to at least one other port of the housing, wherein the shank has an in particular minimum, maximum, or mean diameter that is smaller than the ring and in one embodiment is configured so as to be integral thereto or connected thereto in particular in a materially integral manner.

In one aspect of the invention, the first, the second, the third, the fourth, the fifth, the sixth, and/or at least one further port is a port that is lateral in particular in relation to the rotation axis. In one embodiment, the first, the second, the third, the fourth, the fifth, the sixth, and/or at least one further port is a port that is axial in particular in relation to the rotation axis.

In one preferred refinement, the second, the third, the fourth, the fifth, the sixth, and/or the further port is (in each case) a lateral port, and/or the first port is an axial port.

In one aspect of the invention, a compact particularly fluid valve which enables or implements, respectively, particularly advantageous selective dissimilar switching of fluid ducts that are connected to the ports of the fluid valve is enabled or implemented on account thereof, respectively.

A port of the housing mentioned here can in each case be a port to or on the valve body, respectively, or have a port opening or entry and/or exit opening of the housing, respectively, that faces the valve body or is opposite or adjacent to the valve body, respectively, and/or have one single-part or multiple-part seal on or in relation to the valve body, respectively, and/or have or in particular be a tubular connector of the housing that fluidically communicates with the valve body.

Accordingly, the first, the second, the third, the fourth, the fifth, the sixth, and/or at least one further port in one embodiment has a tubular connector of the housing which is disposed laterally (in particular on a single-part or multiple-part shell face of the housing about the rotation axis), the longitudinal axis of the tubular connector being oriented transversely to the rotation axis, in one embodiment forming an angle with the rotation axis, the angle being at least 50°, in particular at least 75°. The first, the second, the third, the fourth, the fifth, the sixth, and/or at least one further port has a tubular connector of the housing, which is disposed axially (in particular on an end face of the housing that is axial in relation to the rotation axis) the longitudinal axis of the tubular connector in one embodiment forming an angle with the rotation axis, the angle being at most 40°, in particular at most 30°.

In one preferred refinement, the second, the third, the fourth, the fifth, the sixth, and/or the further port is a lateral port, and/or the first port is an axial port. In one embodiment, the second, the third, the fourth, the fifth, the sixth, and/or the further port has one of the laterally disposed tubular connector(s), and/or the first port has one, or the axially disposed tubular connector, respectively.

In one aspect of the invention, a separate elbow piece is disposed in a rotatable or rotatably fixed manner on one or a plurality of the tubular connectors.

In one aspect of the invention, in particular in combination with two or more of the aforementioned features, a particularly variable fluid valve is made available on account thereof.

In one aspect of the invention, the housing and/or the valve body are/is produced, in particular primarily formed, as a single part or as multiple parts and/or at least in part from plastics material.

A compact fluid valve can be advantageously produced in particular in combination with one or a plurality of the aforementioned features.

In order for a fluid valve described here to be operated according to one aspect of the present invention, the valve body in one embodiment in one operating state is adjusted or rotated, respectively, in a motorized and/or automated manner, to one of the rotary positions and in at least one operating position different therefrom is adjusted or rotated, respectively, in a motorized and/or automated manner, to one of the rotary positions different therefrom, or the fluid valve is provided, in particular specified or used therefor, respectively.

Connecting ports herein is in particular understood as connecting in a fluidic manner.

BRIEF DESCRIPTION OF THE DRAWINGS

Further advantages and features are derived from the dependent claims and the exemplary embodiments. To this end, in the partially schematic figures:

FIGS. 7A-7D are different rotary positions of the valve body; and

FIG. 8 is a rotary position of the valve body of a fluid valve in an illustration corresponding to that of FIGS. 7A-D.

DETAILED DESCRIPTION OF THE PRESENTLY PREFERRED EMBODIMENTS

Figure 1A:
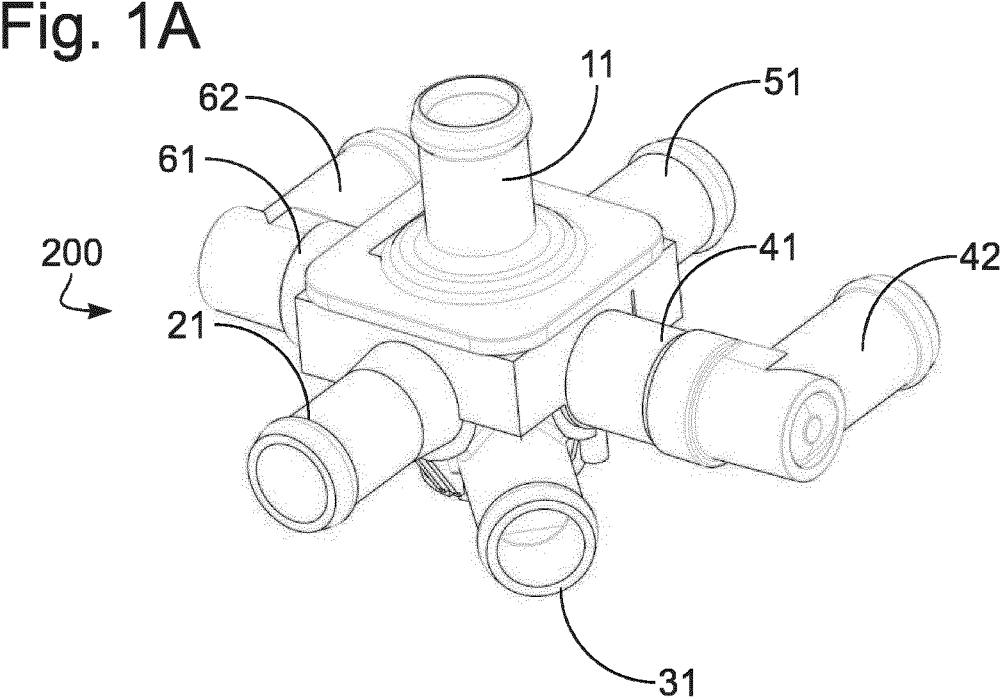
FIGS. 1A, 1B are a fluid valve in a perspective view from above and below, respectively.
Figure 1B:
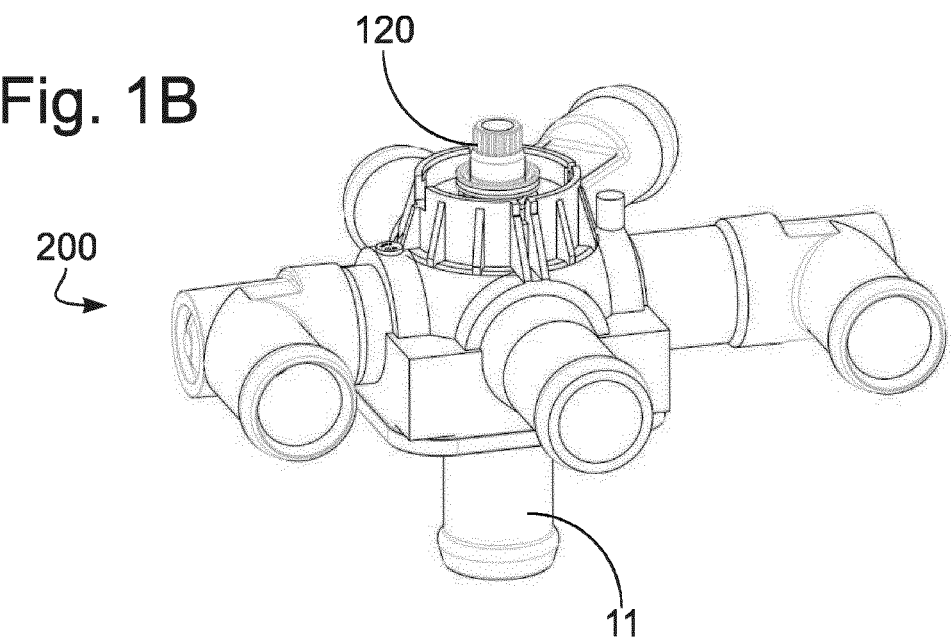
Figure 2:
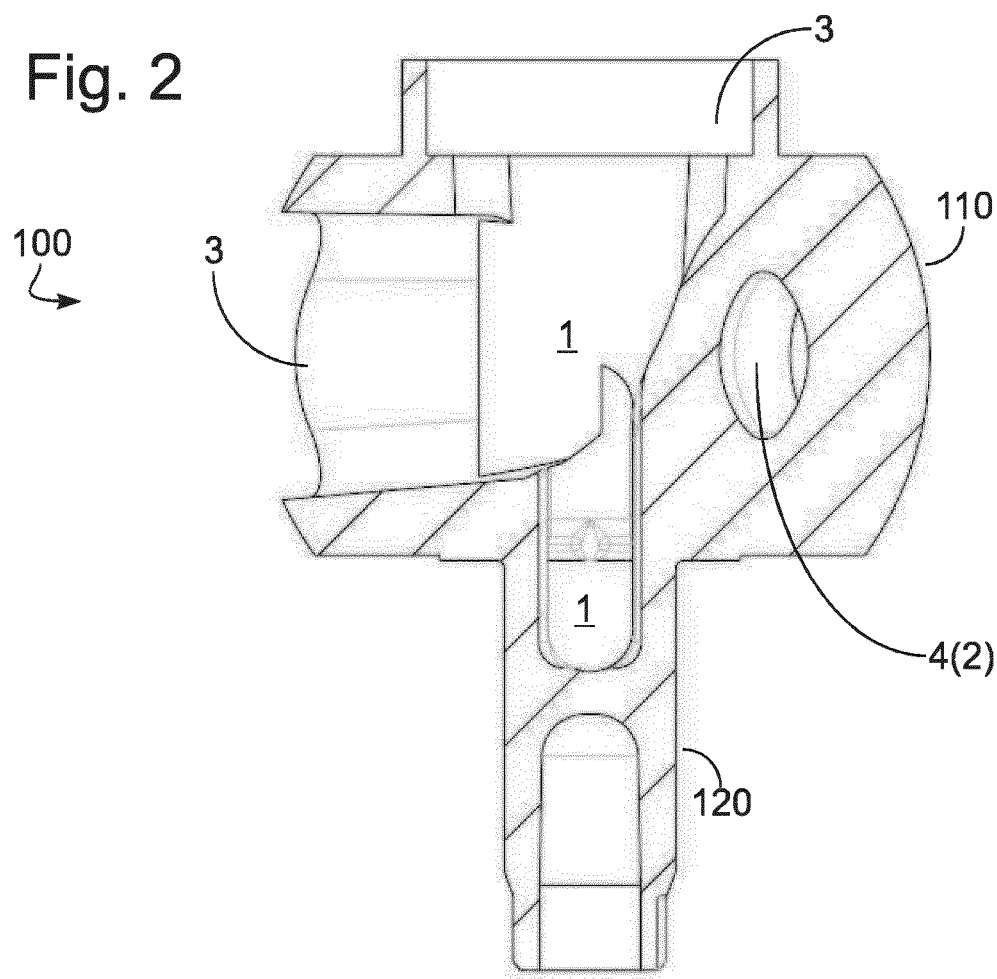
FIG. 2 is a section along a rotation axis through a valve body of the fluid valve.
Figure 3:
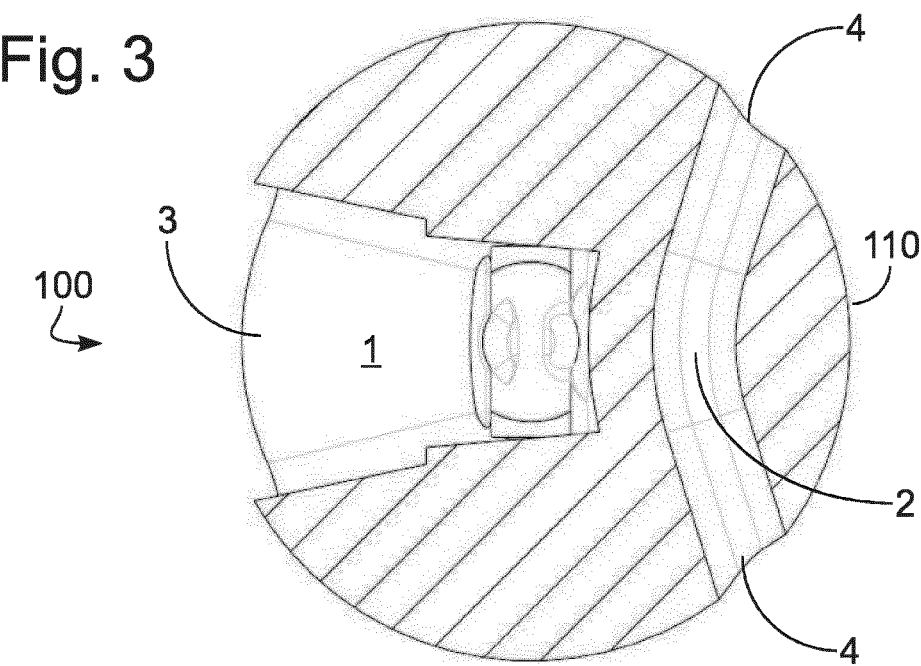
FIG. 3 is a section perpendicular to the rotation axis through the valve body.
Figure 4:
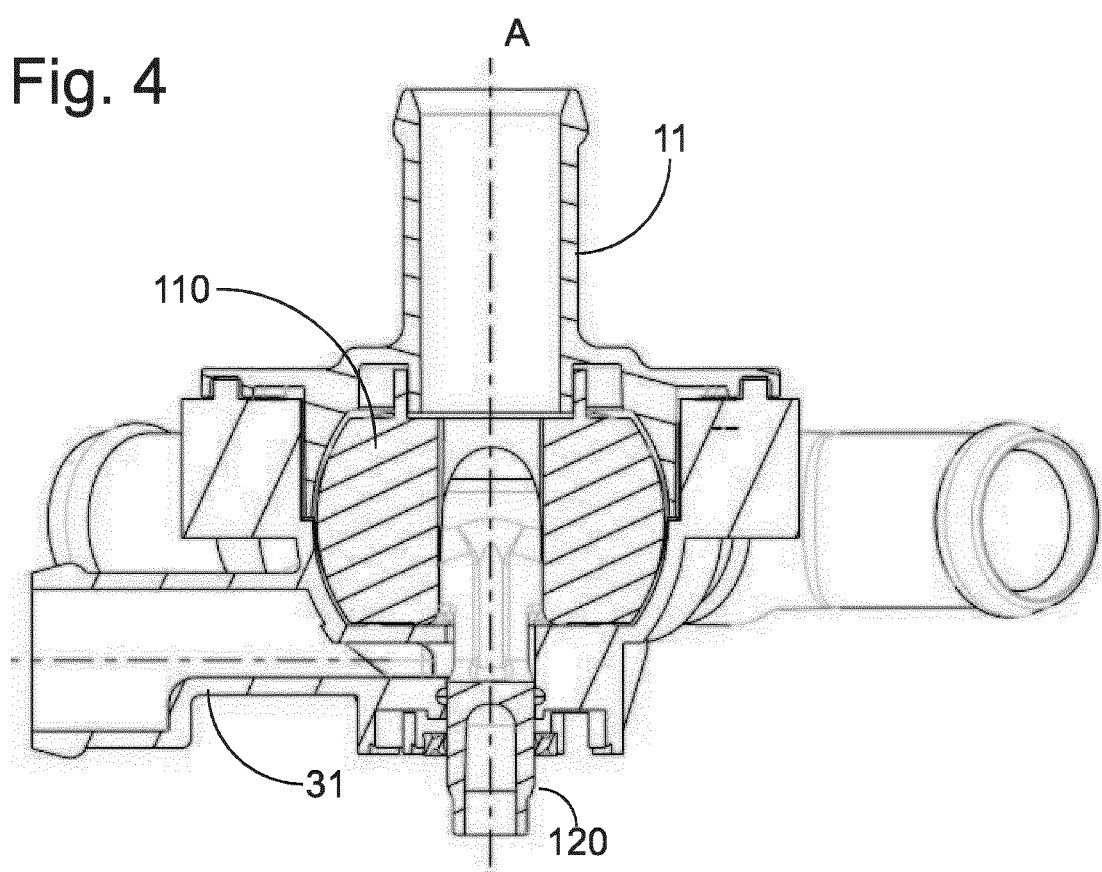
FIG. 4 shows a section corresponding to that of FIG. 2 through is fluid valve.
Figure 5:
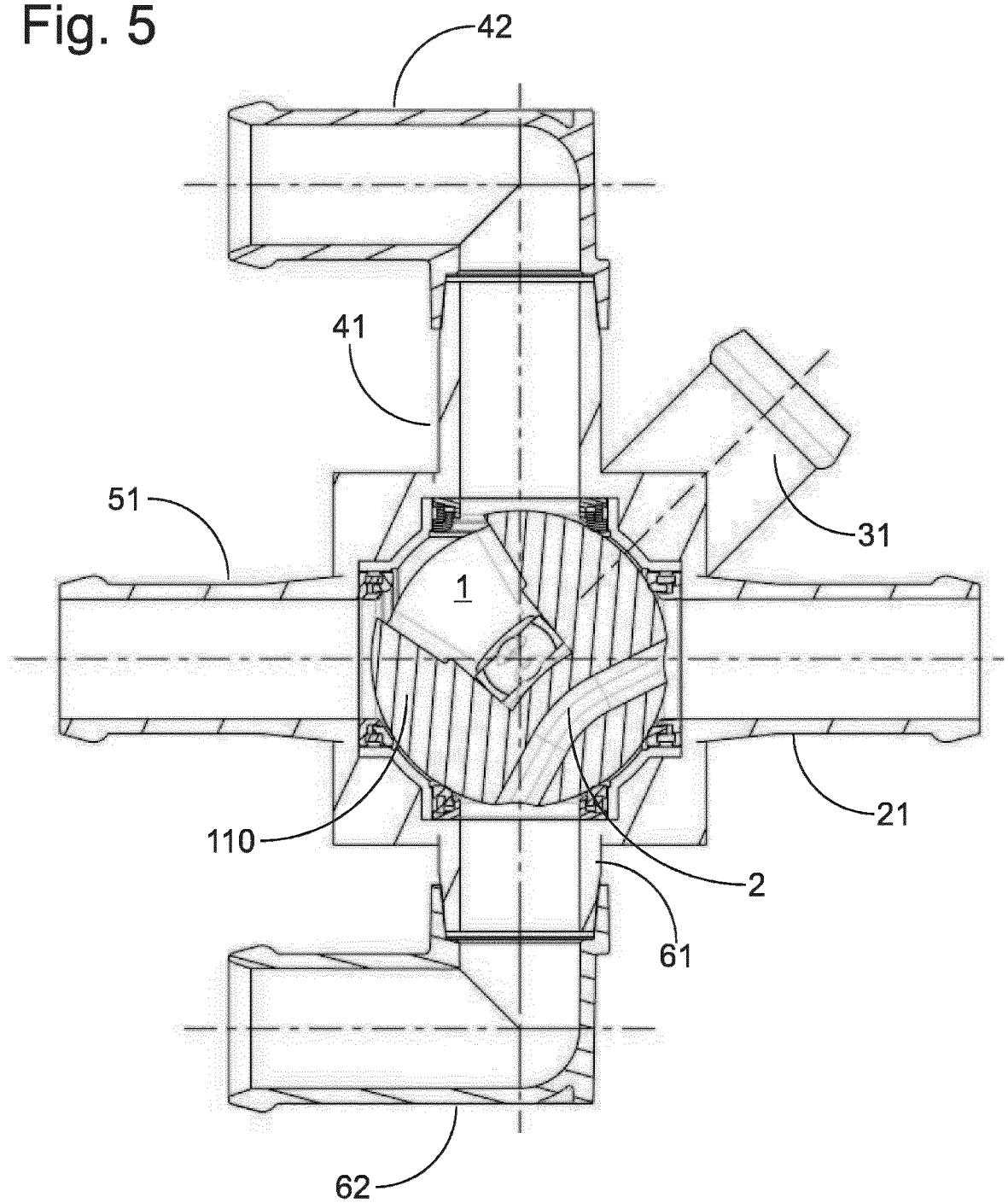
FIG. 5 is a section corresponding to that of FIG. 3 through the fluid valve.
Figure 6:
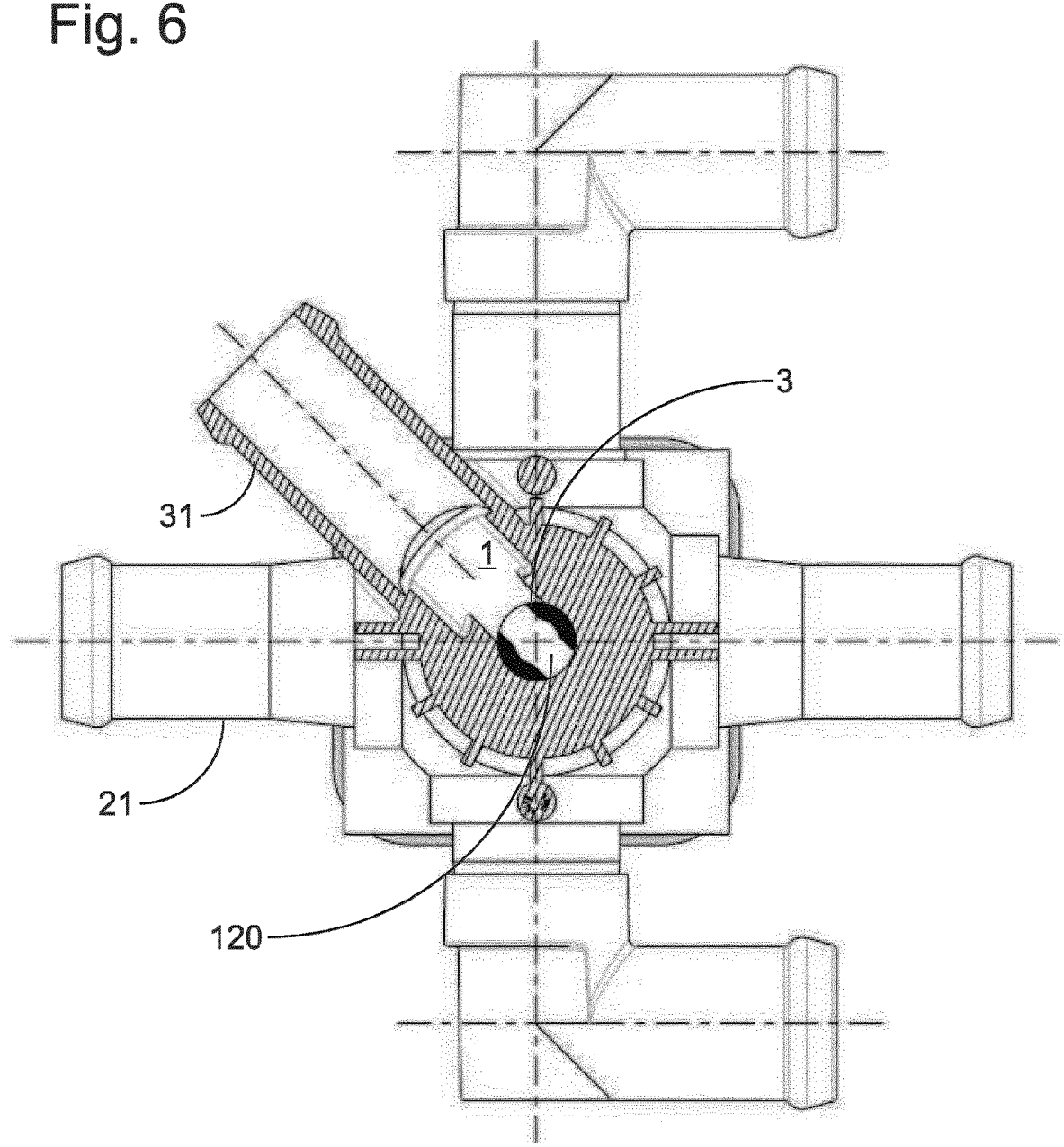
FIG. 6 is a section perpendicular to the rotation axis through the fluid valve at another axial height.

FIGS. 7A-7D in a partially schematic manner show different rotary positions of a valve body 100 of a fluid valve according to one aspect of the present invention, the fluid valve being shown in different views or sections, respectively, in FIGS. 1-6.

The valve body 100 has a ring 110 and a shank 120 having a smaller diameter. As can be seen in particular in FIGS. 2 and 4, the ring 110 is a spherical ring and for simplification is illustrated so as to be cylindrical in FIGS. 7A-7D.

In a rotary position shown in FIG. 7A, a first fluid passage 1 of the valve body 100 connects an axial first port 10, which has an axial tubular connector 11, to a lateral third port 30, which has a lateral tubular connector 31, to a lateral fourth port 40, which has a lateral tubular connector 41, and to a lateral fifth port 50, which has a lateral tubular connector 51, while a further fluid passage 2 of the valve body 100 connects a lateral second port 20, which has a lateral tubular connector 21, to a lateral sixth port 60, which has a lateral tubular connector 61.

FIGS. 7B-7D show positions of the valve body 100 which are in each case further rotated by 90° about a rotation axis A; the sequence of FIGS. 7A 7B 7C 7D shows a method for operating the fluid valve according to one aspect of the present invention.

In a rotary position shown in FIG. 7B it can be seen that the valve body 100, or the further fluid passage 2, thereof, respectively, now connects the second and the fourth port 20, 40, while the valve body 100, or the first fluid passage 1 thereof, respectively, connects the first, the fifth, and the sixth port 10, 50, 60.

In a further rotary position shown in FIG. 7C the valve body 100, or the first fluid passage 1, thereof, respectively, connects the first, the second, the third, and the sixth port 10, 20, 30, 60, while the valve body 100, or the further fluid passage 2 thereof, respectively, now connects the fourth and the fifth port 40, 50.

In a further rotary position shown in FIG. 7D the valve body 100, or the first fluid passage 1, thereof, respectively, connects the first, the second and the fourth port 10, 20, 40 while the valve body 100, or the further fluid passage 2 thereof, respectively, now connects the fifth and the sixth port 50, 60.

This in an exemplary manner illustrates one potential advantageous design embodiment, or switching (possibility) of the ports 10, 20, 30, 40, 50, and 60, without the invention being limited thereto.

FIGS. 1A, 1B, 4, 5, and 6 show the housing 200 having the tubular connectors 11, 21, 31, 41, 51, and 61; FIGS. 2 to 6 show the valve body 100 having the first and the further fluid passages 1, 2, or the (fluid passage) openings 3 (openings of the first fluid passage 1) or 4 (openings of the further fluid passage 2) thereof, respectively.

Two elbow pieces 42, 62 disposed on the tubular connectors 41, 61 can be seen.

FIG. 8 in an illustration corresponding to that of FIGS. 7A-D shows a rotary position of the valve body of a fluid valve according to a further embodiment of the present invention. Features corresponding to one another are identified by identical reference signs, such that reference is made to the above description and only points of differentiation will be discussed below.

In the further embodiment, the first fluid passage 1 of the valve body 100 in the rotary position shown in FIG. 8 connects the axial first port 10 to the third port 30, the fourth port 40, a lateral further port 70, which has a lateral tubular connector 71, and a lateral further port 80, which has a lateral tubular connector 81, while the further fluid passage 2 of the valve body 100 connects the second port 20 to the sixth port 60.

This again in only an exemplary manner illustrates a potential combination of the ports 10, 20, 30, 40, 50, and 60 with two further ports 70, 80, without the invention being limited to this switching possibility of such ports.

Although exemplary embodiments have been discussed in the above description, it should be noted that numerous modifications are possible. Furthermore, it should be noted that the exemplary embodiments are merely examples which are not intended to limit the scope of protection, applications and structure in any way. Rather, the above description will provide a person skilled in the art with a guideline for implementing at least one exemplary embodiment, wherein various modifications, in particular with regard to the function and arrangement of the described constituent parts, may be made without departing from the scope of protection as defined by the claims and by these equivalent combinations of features.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A fluid valve, comprising:
a valve body having multiple internal flowpaths and configured to be rotatable about a rotation axis; and
a housing in which the valve body is at least partially disposed, and comprises:
a first port disposed on a first side of a normal plane in relation to the rotation axis;
a third port disposed on a second side of the normal plane in relation to the rotation axis, which is opposite the first side of the normal plane; and
a second port radially spaced apart from the rotation axis and in a direction of the rotation axis is disposed between the first port and the third port on the normal plane;
a fourth port which is radially spaced apart from the rotation axis and in a circumferential direction about the rotation axis is disposed on the normal plane:
spaced apart from the first, the second and/or the third port and/or
in the direction of the rotation axis between the first port and the third port;
wherein the valve body in at least one rotary position connects at least two ports of the housing to one another via the multiple internal flowpaths, and in at least one other rotary position does not connect the at least two ports to one another,
wherein the multiple internal flowpaths comprise two separate flow paths through the valve body based on the rotary position of the valve body, and
wherein the valve body is configured such that each port on the normal plane is connectable to each circumferentially adjacent port on the normal plane through the valve body, and
wherein the first port is always connectable to at least one of the circumferentially adjacent ports on the normal plane via the internal flowpath, and
wherein the third port is connectable to at least one of the circumferentially adjacent ports on the normal plane via the internal flowpath and the first port and disconnectable from the first port.

2. The fluid valve as claimed in claim 1, wherein the housing further comprises:
the fourth port which is:
spaced apart from the first, the second and/or the third port and/or
in the direction of the rotation axis between the first port and the third port;
a fifth port which is radially spaced apart from the rotation axis and in the circumferential direction about the rotation axis is disposed:
to be spaced apart from the first, the second, the third, and/or the fourth port and/or
in the direction of the rotation axis between the first and the third port; and
a sixth port which is radially spaced apart from the rotation axis and in the circumferential direction about the rotation axis is disposed:
to be spaced apart from the first, the second, the third, the fourth, and/or the fifth port and/or
in the direction of the rotation axis between the first and the third port.

3. The fluid valve as claimed in claim 2, wherein the housing comprises:
at least one further port, radially spaced apart from the rotation axis;

which in the circumferential direction about the rotation axis is spaced apart from the first, the second, the third, the fourth, the fifth, and/or the sixth port;

which in the direction of the rotation axis is disposed between the first and the third port; and/or the second port is disposed between the at least one further port and the first or the third port.

4. The fluid valve as claimed in claim 3, wherein the first, the second, the third, the fourth, the fifth, the sixth, and/or at least one further port are/is a lateral or an axial port and/or has a tubular connector of the housing, in particular the second, the third, the fourth, the fifth, and/or the sixth and/or the further port are/is a lateral port and/or has a lateral tubular of the housing, and/or the first port is an axial port and/or has an axial tubular connector of the housing.

5. The fluid valve as claimed in claim 1, wherein the valve body in at least one rotary position connects at least three ports of the housing to one another and in at least one other rotary position does not connect at least two of the at least three ports to one another.

6. The fluid valve as claimed in claim 1, wherein the valve body in at least one rotary position connects at least one first group of ports of the housing to one another and connects at least one second group of ports of the housing to one another and not to the first group.

7. The fluid valve as claimed in claim 1, wherein the valve body comprises:
a first fluid passage which in at least one rotary position of the valve body connects a first group of ports of the housing to one another; and
at least one further fluid passage which is separate from the first fluid passage and which in the and/or at least one other rotary position of the valve body connects a second group of ports of the housing to one another and not to the first group.

8. The fluid valve as claimed in claim 7, wherein at least one of:
(1) the first fluid passage in the valve body has at least two openings that in a circumferential direction about the rotation axis are spaced apart from one another, and/or in an end face of the valve body has at least one opening, the valve body has at least two openings that in the direction of the rotation axis are spaced apart from one another;
(2) the at least one further fluid passage in the valve body have at least two openings that in a circumferential direction about the rotation axis are spaced apart from one another, and/or in an end face of the valve body has at least one opening, the valve body has at least two openings that in the direction of the rotation axis are spaced apart from one another;
(3) the at least two openings of the first fluid passage in the valve body are radially dissimilarly spaced apart from the rotation axis;
(4) the at least two openings of the at least one further fluid passage in the valve body are radially dissimilarly spaced apart from the rotation axis;
(5) at least one opening of the first fluid passage in the valve body and at least one opening of the at least one further fluid passage in of the valve body are radially dissimilarly spaced apart from the rotation axis; and/or
(6) the first fluid passage and the at least one further fluid passage in at least two different rotary positions of the valve body connects a same port to at least one port of the housing.

9. The fluid valve of claim 1, wherein the valve is configured for a motor vehicle and/or a temperature control system.

10. The fluid valve as claimed in claim 1, wherein the valve body in at least one rotary position connects at least three ports of the housing to one another and in at least one other rotary position does not connect any of the three ports to one another.

11. The fluid valve as claimed in claim 6, wherein the valve body in at least one rotary position connects at least one port from the first group and at least one port from the second group to one another and/or connects or does not connect at least two ports from the first group to one another and/or connects or does not connect at least two ports from the second group to one another.

12. A fluid valve, comprising:
a valve body having multiple internal flowpaths and configured to be rotatable about a rotation axis; and
a housing in which the valve body is at least partially disposed, and comprises:
a first port disposed on a first side of a normal plane in relation to the rotation axis;
a third port disposed on a second side of the normal plane in relation to the rotation axis, which is opposite the first side of the normal plane; and
a second port radially spaced apart from the rotation axis and in a direction of the rotation axis is disposed between the first port and the third port on the normal plane;
a fourth port which is radially spaced apart from the rotation axis and in a circumferential direction about the rotation axis is disposed on the normal plane:
spaced apart from the first, the second and/or the third port and/or
in the direction of the rotation axis between the first port and the third port;
wherein the valve body in at least one rotary position connects at least two ports of the housing to one another via the multiple internal flowpaths, and in at least one other rotary position does not connect the at least two ports to one another,
wherein the wherein the multiple internal flowpaths comprise two separate flow paths through the valve body based on the rotary position of the valve body, and
wherein the valve body is configured such that each port on the normal plane is connectable to each circumferentially adjacent port on the normal plane through the valve body, and
wherein the first port is always connectable to at least one of the circumferentially adjacent ports on the normal plane via the internal flowpath, and
wherein the third port is connectable to at least one of the circumferentially adjacent ports on the normal plane via the internal flowpath and the first port and disconnectable from the first port,
wherein the valve body comprises:
a first fluid passage which in at least one rotary position of the valve body connects a first group of ports of the housing to one another; and
at least one further fluid passage which is separate from the first fluid passage and which in the and/or at least one other rotary position of the valve body connects a second group of ports of the housing to one another and not to the first group, wherein in at least one rotary position of the valve body the second port by way of one of the first or further fluid passage openings in a ring of the valve body is connected to at least one other port of the housing, and in at least one rotary position of the valve body the first or the third port by way of the internal flowpath of the valve body is connected to at least one other port of the housing, a shank of the valve body having a smaller diameter than the ring.

13. A temperature control system, in particular for a motor vehicle, having at least one fluid valve comprising:
  a valve body having multiple internal flowpaths and configured to be rotatable about a rotation axis; and
  a housing in which the valve body is at least partially disposed, and comprises:
    a first port disposed on a first side of a normal plane in relation to the rotation axis;
    a third port disposed on a second side of the normal plane in relation to the rotation axis, which is opposite the first side of the normal plane; and
    a second port radially spaced apart from the rotation axis and in a direction of the rotation axis is disposed between the first port and the third port on the normal plane;
    a fourth port which is radially spaced apart from the rotation axis and in a circumferential direction about the rotation axis is disposed on the normal plane:
      spaced apart from the first, the second and/or the third port and/or
      in the direction of the rotation axis between the first port and the third port;
    wherein the valve body in at least one rotary position connects at least two ports of the housing to one another via the multiple internal flowpaths, and in at least one other rotary position does not connect the at least two ports to one another,
    wherein the wherein the multiple internal flowpaths comprise two separate flow paths based on the rotary position of the valve body, and
    wherein the first port is always connectable to at least one of the circumferentially adjacent ports on the normal plane via the internal flowpath, and
    wherein the third port is connectable to at least one of the circumferentially adjacent ports on the normal plane via the internal flowpath and the first port and disconnectable from the first port.

14. A motor vehicle having at least one fluid valve, in particular a temperature control system, comprising:
  a valve body having multiple internal flowpaths and configured to be rotatable about a rotation axis; and
  a housing in which the valve body is at least partially disposed, and comprises:
    a first port disposed on a first side of a normal plane in relation to the rotation axis;
    a third port disposed on a second side of the normal plane in relation to the rotation axis, which is opposite the first side of the normal plane; and
    a second port radially spaced apart from the rotation axis and in a direction of the rotation axis is disposed between the first port and the third port on the normal plane;
    a fourth port which is radially spaced apart from the rotation axis and in a circumferential direction about the rotation axis is disposed on the normal plane:
      spaced apart from the first, the second and/or the third port and/or
      in the direction of the rotation axis between the first port and the third port;
    wherein the valve body in at least one rotary position connects at least two ports of the housing to one another via the multiple internal flowpaths, and in at least one other rotary position does not connect the at least two ports to one another,
    wherein the wherein the multiple internal flowpaths comprise two separate flow paths through the valve body based on the rotary position of the valve body, and
    wherein the valve body is configured such that each port on the normal plane is connectable to each circumferentially adjacent port on the normal plane through the valve body, and
    wherein the first port is always connectable to at least one of the circumferentially adjacent ports on the normal plane via the internal flowpath, and
    wherein the third port is connectable to at least one of the circumferentially adjacent ports on the normal plane via the internal flowpath and the first port and disconnectable from the first port.

15. A method for operating a fluid valve having:
  a valve body having multiple internal flowpaths and configured to be rotatable about a rotation axis; and
  a housing in which the valve body is at least partially disposed, and having:
    a first port disposed on a first side of a normal plane in relation to the rotation axis;
    a third port disposed on a second side of the normal plane in relation to the rotation axis, which is opposite the first side of the normal plane; and
    a second port radially spaced apart from the rotation axis and in a direction of the rotation axis is disposed between the first port and the third port on the normal plane;
    a fourth port which is radially spaced apart from the rotation axis and in a circumferential direction about the rotation axis is disposed on the normal plane:
      spaced apart from the first, the second and/or the third port and/or
      in the direction of the rotation axis between the first port and the third port;
  comprising:
    connecting, by the internal flowpath of the valve body in at least one rotary position at least two ports of the housing to one another; and
    not connecting in at least one other rotary position the at least two ports to one another, comprising:
    adjusting the valve body in one operating state in a motorized and/or automated manner, to a first rotary position; and
    adjusting the valve body in at least one different operating state in a motorized and/or automated manner, to a second rotary position different than the first rotary position
    wherein the wherein the multiple internal flowpaths comprise two separate flow paths through the valve body based on the rotary position of the valve body, and
    wherein the valve body is configured such that each port on the normal plane is connectable to each circumferentially adjacent port on the normal plane through the valve body, and wherein the first port is always connectable to at least one of the circumferentially adjacent ports on the normal plane via the internal flowpath, and wherein the third port is connectable to at least one of the circumferentially adjacent ports on the normal plane via the internal flowpath and the first port and disconnectable from the first port.

\* \* \* \* \*